(12) United States Patent
Yin et al.

(10) Patent No.: US 10,200,146 B2
(45) Date of Patent: Feb. 5, 2019

(54) DATA TRANSMISSION METHOD, APPARATUS, AND SYSTEM

(71) Applicant: Huawei Technologies Co., Ltd., Shenzhen, Guangdong (CN)

(72) Inventors: Jinrong Yin, Beijing (CN); Weiyang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/637,577

(22) Filed: Jun. 29, 2017

(65) Prior Publication Data

US 2017/0302398 A1  Oct. 19, 2017

Related U.S. Application Data

(63) Continuation of application No. PCT/CN2014/095642, filed on Dec. 30, 2014.

(51) Int. Cl.
*H04J 14/04* (2006.01)
*H04B 10/2581* (2013.01)
*G02B 6/38* (2006.01)
*H04L 1/00* (2006.01)
*H04L 25/03* (2006.01)
*H04L 27/02* (2006.01)
(Continued)

(52) U.S. Cl.
CPC ............... *H04J 14/04* (2013.01); *G02B 6/38* (2013.01); *H04B 10/2581* (2013.01); *H04L 1/0042* (2013.01); *H04L 25/03343* (2013.01); *H04L 27/02* (2013.01); *H04L 27/367* (2013.01)

(58) Field of Classification Search
CPC .................................. H04J 14/00; H04J 14/04
See application file for complete search history.

(56) References Cited

U.S. PATENT DOCUMENTS

6,559,943 B1 * 5/2003 Hall .................... H04B 10/675
356/394
7,840,138 B2   11/2010 McEwan et al.
(Continued)

FOREIGN PATENT DOCUMENTS

CN   102461020 A   5/2012
CN   102916748 A   2/2013
(Continued)

OTHER PUBLICATIONS

Franz et al., "Mode Group Division Multiplexing in Graded-Index Multimode Fibers", Bell Labs Technicals Journal, vol. 18, No. 3, Dec. 2013, pp. 153-172.
(Continued)

*Primary Examiner* — Daniel Dobson

(57) ABSTRACT

The present disclosure provides a data transmission method including: receiving a first-mode optical signal from a first port corresponding to a first port number; converting, according to a correspondence between the first port number and a first mode group number, the received first-mode optical signal into a second-mode optical signal carried in a first mode group identified by the first mode group number, where the second-mode optical signal carried in the first mode group identified by the first mode group number includes an optical signal in one or more modes; and outputting the second-mode optical signal obtained by means of conversion.

16 Claims, 7 Drawing Sheets

(51) Int. Cl.
    *H04L 27/36*     (2006.01)
    *H04B 10/00*     (2013.01)

(56) References Cited

U.S. PATENT DOCUMENTS

| | | |
|---|---|---|
| 2012/0121220 A1 | 5/2012 | Krummrich |
| 2014/0140694 A1 | 5/2014 | Zhou et al. |
| 2015/0043910 A1 | 2/2015 | Koebele et al. |
| 2015/0098697 A1* | 4/2015 | Marom .................. H04J 14/04 398/44 |

FOREIGN PATENT DOCUMENTS

| | | |
|---|---|---|
| CN | 104202094 A | 12/2014 |
| CN | 104205693 A | 12/2014 |
| WO | 2013160902 A1 | 10/2013 |

OTHER PUBLICATIONS

Franz et al., "Mode Group Multiplexing over Graded-Index Multimode Fiber" 2012 14th International Conference on Transparent Optical Networks (ICTON 2012), Jul. 2012, 4 pages.

Franz et al., "Spatial Multiplexers and Demuitiplexers for Mode Group Division Multiplex", 2013 15th International Conference on Transparent Optical Networks (ICTON 2013), Jun. 2013, 4 pages.

Franz et al., "Experimental Evaluation of Principal Mode Groups as High-Speed Transmission Channels in Spatial Multiplex Systems", IEEE Photonics Technology Letters, vol. 24, No. 16, Aug. 1, 2012, pp. 1363-1365.

Koonen et al., "High capacity mode group division multiplexed multimode fiber systems", The 16th Opto-Electronics and Communications Conference (OECC 2011), Jul. 2011, pp. 826-827.

Guofeng, "Methods of Increasing the Bandwidth-distance Product for Multimode Fibers in LAN", Journal of Optical Communications, vol. 29, No. 8, Dec. 2008, pp. 213-216.

Shi et al., "Degenerate Mode-Group Division Multiplexing using MIMO Digital Signal Processing", 2013 IEEE Photonics Society Summer Topical Meeting Series, Jul. 2013, pp. 141-142.

De Boer et al., "A First Demonstrator for a Mode Group Diversity Multiplexing Communication System", The IEEE Seminar on Optical Fibre Communications and Electronic Signal Processing, Dec. 2005, 5 pages.

Carpenter et al., "Characterization of Multimode Fiber by Selective Mode Excitation", Journal of Lightwave Technology, vol. 30, No. 10, May 2012, pp. 1386-1392.

\* cited by examiner

DATA TRANSMISSION METHOD, APPARATUS, AND SYSTEM

CROSS-REFERENCE TO RELATED APPLICATIONS

This application is a continuation of International Application No. PCT/CN2014/095642, filed on Dec. 30, 2014, the disclosure of which is hereby incorporated by reference in its entirety.

TECHNICAL FIELD

The present disclosure relates to the communications field, and in particular, to a data transmission method, an apparatus, and a system in the communications field.

BACKGROUND

As applications such as big data and cloud computing constantly develop, data center and mobile bearer markets and the like grow rapidly. When a multimode optical fiber is used, a relatively low cost laser may be used, which has an advantage of low system costs. Therefore, the multimode optical fiber is highly competitive in short-range transmission scenarios such as data center transmission and mobile bearer transmission In addition, as a data center and a mobile bearer network grow in scale, to control an optical fiber scale, a requirement for a single-fiber capacity is increasing. In the prior art, a parallel system solution is mainly used. For example, in a parallel system that supports 40 Gbps, 100 Gbps, and 400 Gbps, 4 pairs of 10-Gbps transceivers, 10 pairs of 10-Gbps transceivers, and 16 pairs of 25-Gbps transceivers are respectively used to carry optical signals in parallel optical fibers respectively including 4, 10, and 16 optical fibers, to implement 40-Gbps, 100-Gbps, and 400-Gbps network transmission. However, such a method is combining multiple optical fibers to implement large-capacity data transmission, without increasing a transmission capacity of a single optical fiber. As a network capacity and a network rate increase, how to increase the transmission capacity of the single optical fiber is a problem that needs to be urgently resolved.

SUMMARY

Embodiments of the present disclosure provide a data transmission method, an apparatus, and a system, to implement big data transmission by increasing a transmission capacity of a single optical fiber, and implement fast expansion of the transmission capacity, thereby improving total bandwidth utilization of a system.

According to a first aspect, a data transmission method is provided, where the method includes:
receiving a first optical signal from an input port;
converting, according to a correspondence between an input port of an optical signal and a mode group, the received first optical signal into a second optical signal in one or more modes in a mode group corresponding to the input port; and
multiplexing the second optical signal obtained by means of conversion to a multimode optical fiber for transmission.

With reference to the first aspect, in a first implementation, the first optical signal is an optical signal in one or more modes.

With reference to the first aspect or the first implementation, in a second implementation, the mode group includes optical signals in one or more modes, where the one or more modes have a same propagation constant or approximate propagation constants.

According to a second aspect, a data transmission method is provided, where the method includes:
receiving a second optical signal;
determining a mode group to which the second optical signal belongs; and
outputting, according to a correspondence between an output port and a mode group, the received second optical signal from a corresponding output port.

With reference to the second aspect, in a first manner, the method further includes:
converting the second optical signal into a preset-mode optical signal for output.

With reference to the second aspect, in a second implementation, the second optical signal is an optical signal in one or more modes.

With reference to the second aspect, in a third implementation, the mode group includes optical signals in one or more modes, where the one or more modes have a same propagation constant or approximate propagation constants.

According to a third aspect, a mode multiplexer is provided, where the mode multiplexer includes:
a first port processing unit, configured to receive a first optical signal from an input port; and multiplex, according to an instruction from a first processor, the second optical signal obtained by means of conversion to a multimode optical fiber for transmission; and
the first processor, configured to: convert, according to a correspondence between an input port of an optical signal and a mode group, the received first optical signal into a second optical signal in one or more modes in a mode group corresponding to the input port; and instruct the first port processing unit to multiplex the second optical signal obtained by means of conversion to a multimode optical fiber for transmission.

With reference to the third aspect, in a first implementation of the third aspect, the first optical signal is an optical signal in one or more modes.

With reference to the third aspect, in a second implementation of the third aspect, the mode group includes optical signals in one or more modes, where the one or more modes have a same propagation constant or approximate propagation constants.

According to a fourth aspect, a mode demultiplexer is provided, where the mode demultiplexer includes:
a second port processing unit, configured to receive a second optical signal; and output, according to an instruction from a second processor, the received second optical signal from a corresponding output port; and
the second processor, configured to: determine a mode group to which the second optical signal belongs; obtain, according to a correspondence between an output port and a mode group, the output port corresponding to the received second optical signal; and instruct the second port processing unit to output the received second optical signal from the corresponding output port.

With reference to the fourth aspect, in a first implementation of the fourth aspect, the second processor is further configured to convert the second optical signal into a preset-mode optical signal; and instruct the second port processing unit to output the signal obtained by means of conversion from a corresponding output port; and the second port processing unit is further configured to output the optical signal obtained by means of conversion from the corresponding port according to an instruction from the second processor.

With reference to the fourth aspect, in a second implementation of the fourth aspect, the second optical signal is an optical signal in one or more modes.

With reference to the fourth aspect, in a third implementation of the fourth aspect, the mode group includes optical signals in one or more modes, where the one or more modes have a same propagation constant or approximate propagation constants.

According to a fifth aspect, a spatial division multiplexing system is provided, where the spatial division multiplexing system includes at least the embodiment in the third aspect described above.

With reference to the fifth aspect, in a first implementation of the fifth aspect, the system further includes the embodiment in the fourth aspect described above.

According to a sixth aspect, a data communications apparatus is provided, where the apparatus includes a processor, a memory, and a bus system; the processor and the memory are connected by using the bus system; the memory is configured to store an instruction; and the processor is configured to execute the instruction stored in the memory; and the processor is configured to: receive a first optical signal from an input port; convert, according to a correspondence between an input port of an optical signal and a mode group, the received first optical signal into a second optical signal in one or more modes in a mode group corresponding to the input port; and multiplex the second optical signal obtained by means of conversion to a multimode optical fiber for transmission.

According to a seventh aspect, a data communications apparatus is provided, where the apparatus includes a processor, a memory, and a bus system; the processor and the memory are connected by using the bus system; the memory is configured to store an instruction; and the processor is configured to execute the instruction stored in the memory; and the processor is configured to: receive a second optical signal; determine a mode group to which the second optical signal belongs; and output the received second optical signal from a corresponding output port according to a correspondence between an output port and a mode group.

Based on the foregoing technical solutions, in the embodiments of the present disclosure, a mode demultiplexer receives a first optical signal from an input port; converts, according to a correspondence between an input port of an optical signal and a mode group, the received first optical signal into a second optical signal in one or more modes in a mode group corresponding to the input port; and multiplexes the second optical signal obtained by means of conversion to a multimode optical fiber for transmission without replacing an existing optical fiber of a data center. This implements big data transmission by increasing a transmission capacity of a single optical fiber, and implements fast expansion of the transmission capacity, thereby improving total bandwidth utilization of a system.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1A:
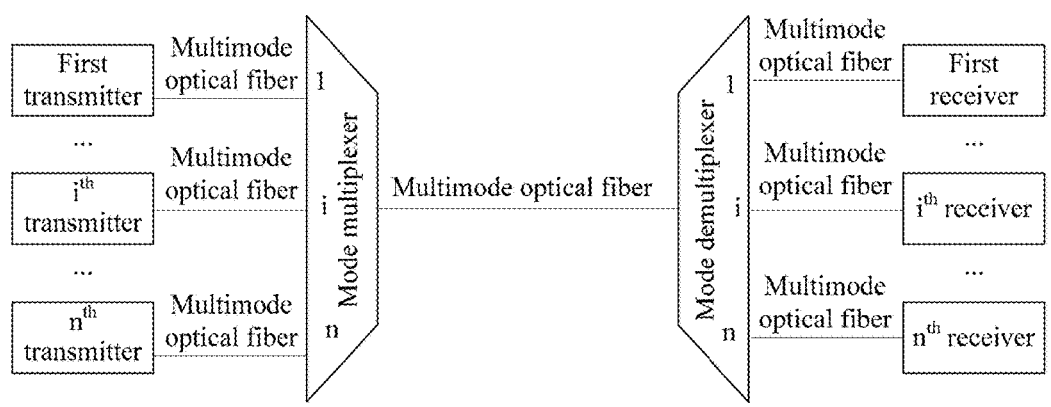
FIG. 1A is a schematic block diagram of an application scenario according to an embodiment of the present disclosure.

FIG. 1A is a schematic block diagram of an application scenario according to an embodiment of the present disclosure. As shown in FIG. 1, the system is a multimode optical fiber-based Spatial Division Multiplexing (SDM) system, and includes: transmitters, a mode multiplexer, a mode demultiplexer, and receivers. The transmitters are separately connected to the mode multiplexer by using multimode optical fibers. The mode multiplexer and the mode demultiplexer are connected by using a multimode optical fiber. The mode demultiplexer is connected to the receivers by using multimode optical fibers. The mode multiplexer multiplexes optical signals that are transmitted by the transmitters by using the multimode optical fibers, to the multimode optical fiber between the mode multiplexer and the mode demultiplexer. The mode demultiplexer is configured to transmit, by using the multimode optical fibers connected to the mode demultiplexer, the received optical signals to the receivers for data processing and restoration. The mode multiplexer has multiple input ports, and the mode demultiplexer has multiple output ports. An input port of the mode multiplexer has a correspondence with an output port of the mode demultiplexer. For example, the mode demultiplexer forwards, by using a first port of the mode multiplexer, an optical signal received from the first port of the mode multiplexer.

The transmitter and the receiver are respectively configured to transmit an optical signal and receive an optical signal.

Figure 1B:
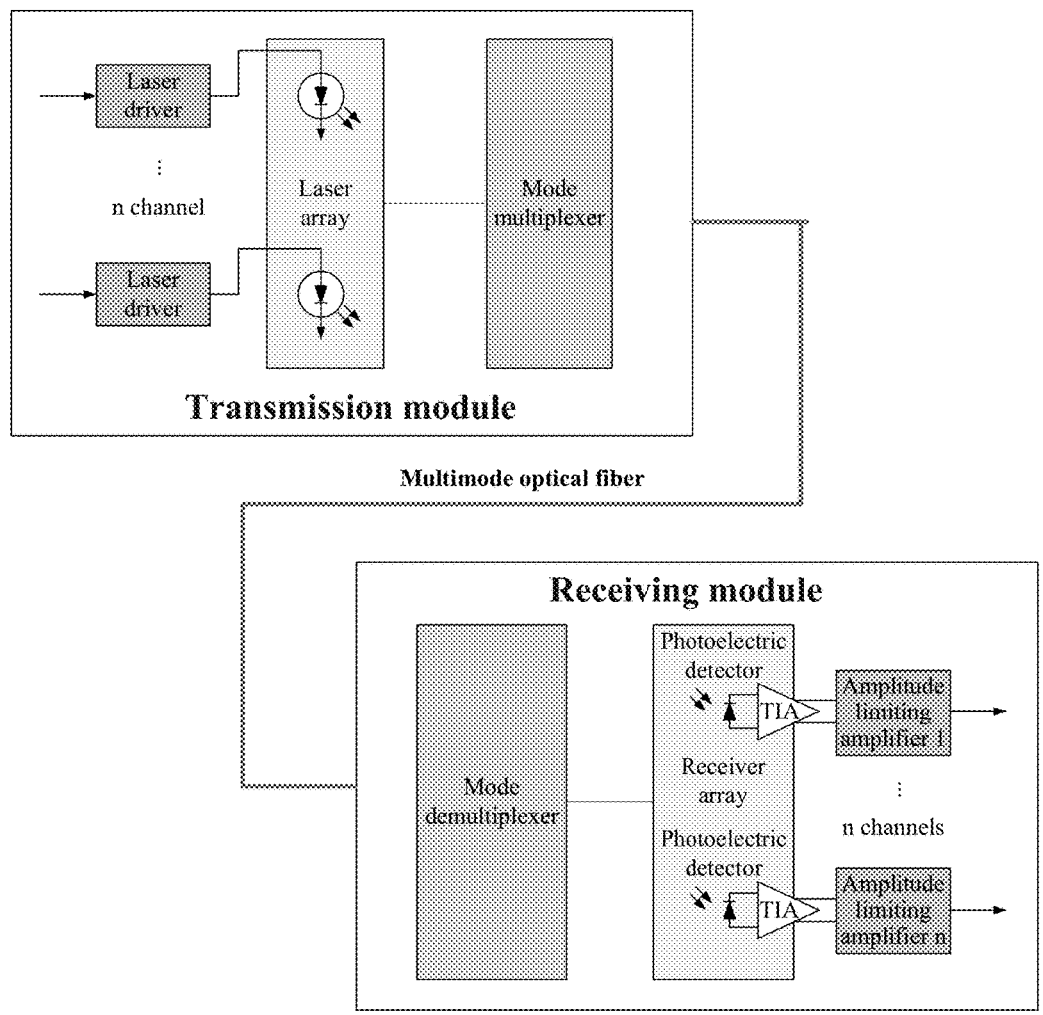
FIG. 1B is a schematic block diagram of an application scenario according to an embodiment of the present disclosure.

As shown in FIG. 1B, FIG. 1B is another network architecture diagram, and specifically illustrates a structural diagram in which a transmitter is integrated with a mode multiplexer and a receiver is integrated with and a mode demultiplexer.

A transmission module includes the transmitter and the mode multiplexer. The transmitter includes n laser drivers and a laser array including n lasers. The transmitter and the mode multiplexer may perform direct spatial coupling, or perform coupling by using a waveguide, to omit a multimode optical fiber between the transmitter and the mode multiplexer.

A receiving module includes a mode demultiplexer and the receiver. The receiver includes a receiver array including n photoelectric detectors, trans-impedance amplifiers TIAs, and n amplitude limiting amplifiers. The receiver and the mode demultiplexer may perform direct spatial coupling, or perform coupling by using a waveguide, to omit a multimode optical fiber between the receiver and the mode demultiplexer.

For functions of the transmission module and the receiving module, refer to detailed descriptions in the following embodiments.

Figure 2:
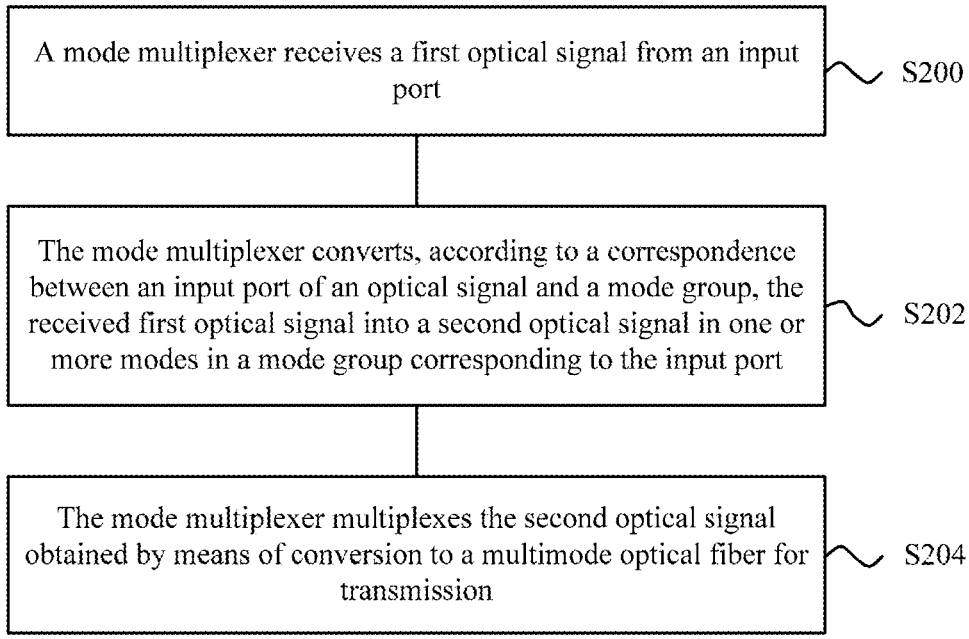
FIG. 2 is a schematic flowchart of a data communication method according to an embodiment of the present disclosure.

FIG. 2 shows a schematic flowchart of a data transmission method according to an embodiment of the present disclosure. The method may be executed by a data communications apparatus, such as the mode multiplexer in FIG. 1. The data transmission method may be applied to the networking architecture diagram shown in FIG. 1. As shown in FIG. 2, the method includes the following steps:

S200. The mode multiplexer receives a first optical signal from an input port.

S202. The mode multiplexer converts, according to a correspondence between an input port of an optical signal and a mode group, the received first optical signal into a second optical signal in one or more modes in a mode group corresponding to the input port.

S204. The mode multiplexer multiplexes the second optical signal obtained by means of conversion to a multimode optical fiber for transmission.

Further, the first optical signal is an optical signal in one or more modes.

Further, the mode group includes optical signals in one or more modes, where the one or more modes have a same propagation constant or approximate propagation constants.

The present disclosure discloses a data transmission method. A mode multiplexer receives a first optical signal from an input port; converts, according to a correspondence between an input port of an optical signal and a mode group, the received first optical signal into a second optical signal in one or more modes in a mode group corresponding to the input port; and multiplexes the second optical signal obtained by means of conversion to a multimode optical fiber for transmission. This implements big data transmission by increasing a transmission capacity of a single optical fiber, and implements fast expansion of the transmission capacity, thereby improving total bandwidth utilization of a system.

Figure 3:
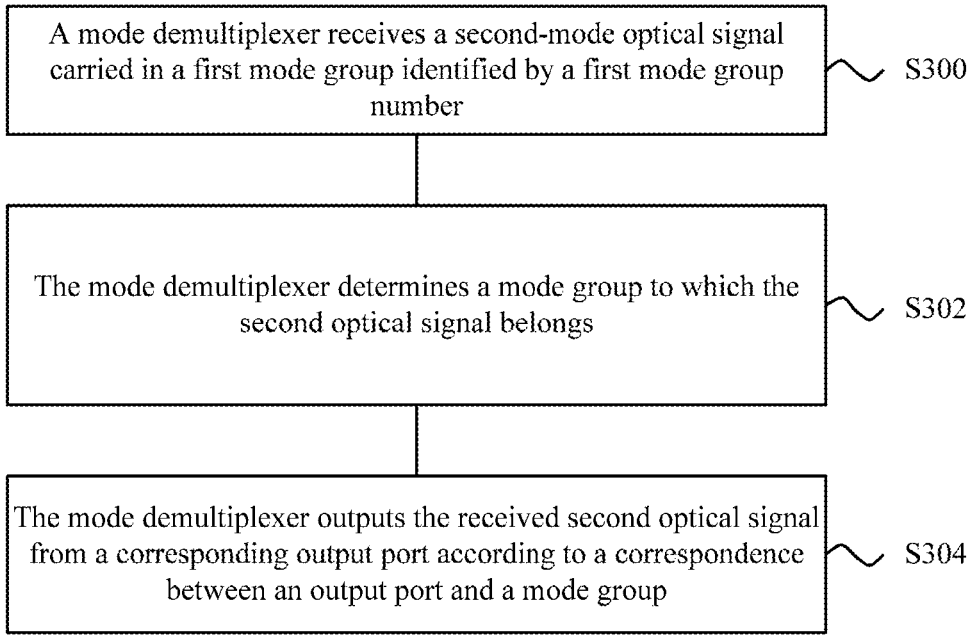
FIG. 3 is another schematic flowchart of a data communication method according to an embodiment of the present disclosure.

FIG. 3 shows a schematic flowchart of a data transmission method according to an embodiment of the present disclosure. The method may be executed by a data communications apparatus, such as the mode demultiplexer in FIG. 1. The data communication method may be applied to the networking architecture diagram shown in FIG. 1. As shown in FIG. 3, the method includes the following steps:

S300. The mode demultiplexer receives a second optical signal.

S302. The mode demultiplexer determines a mode group to which the second optical signal belongs.

S304. The mode demultiplexer outputs the received second optical signal from a corresponding output port according to a correspondence between an output port and a mode group.

Further, the method further includes:

converting, by the mode demultiplexer, the second optical signal into a preset-mode optical signal for output.

Further, the second optical signal is an optical signal in one or more modes.

Further, the mode group includes optical signals in one or more modes, where the one or more modes have a same propagation constant or approximate propagation constants.

The present disclosure discloses a data transmission method. A mode demultiplexer receives a second optical signal; determines a mode group to which the second optical signal belongs; and outputs the received second optical signal from a corresponding output port according to a correspondence between an output port and a mode group. This implements big data transmission by increasing a transmission capacity of a single optical fiber, and implements fast expansion of the transmission capacity, thereby improving total bandwidth utilization of a system.

Figure 4:
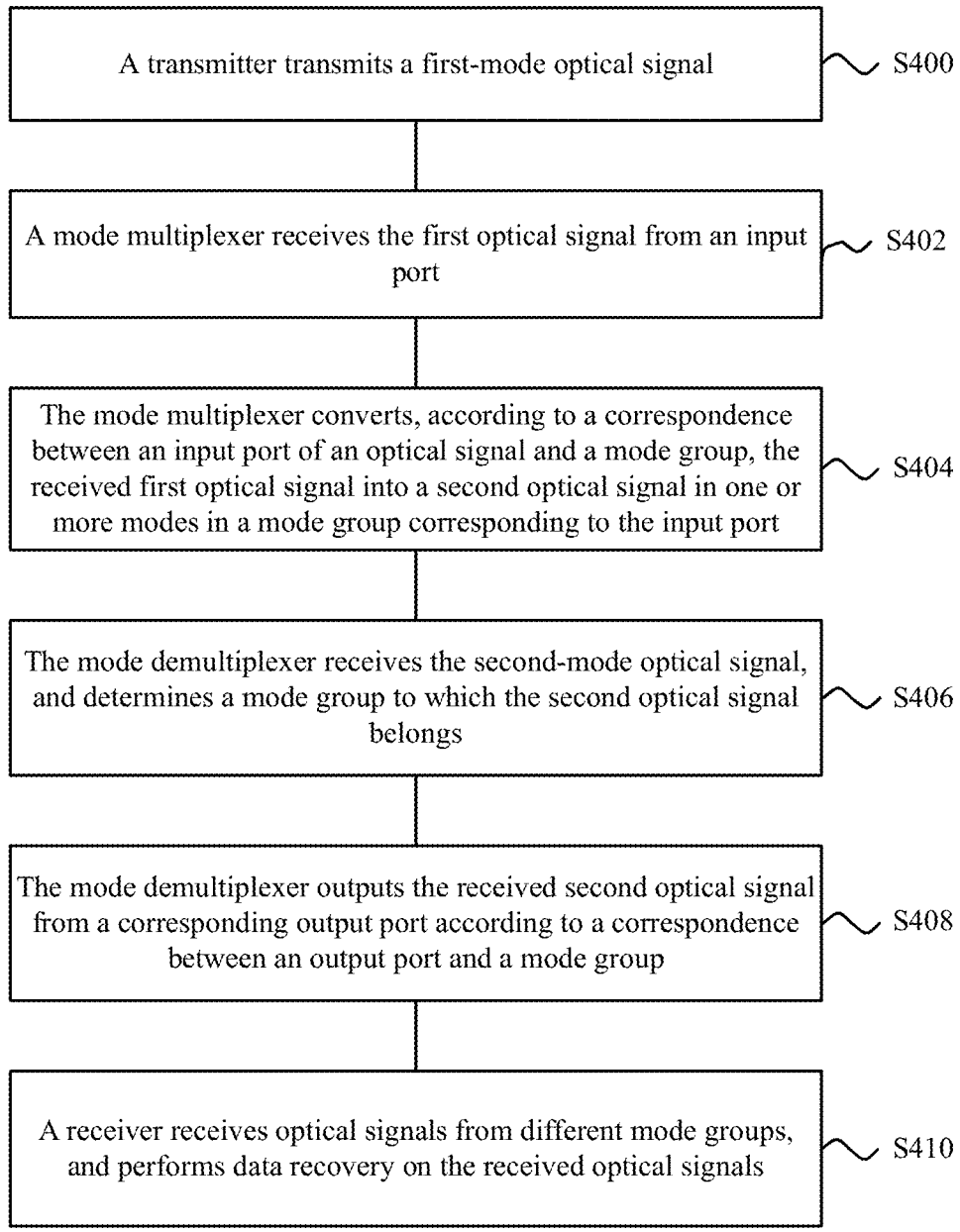
FIG. 4 is a detailed descriptive flowchart of a data communication method according to an embodiment of the present disclosure.

FIG. 4 is a detailed flowchart of a data transmission method according to an embodiment of the present disclosure. The method may be executed by a data communications apparatus, such as the mode demultiplexer in FIG. 1. The data communication method may be applied to the networking architecture diagram shown in FIG. 1. As shown in FIG. 4, the method includes the following steps:

S400. A transmitter transmits a first-mode optical signal.

Figure 5:
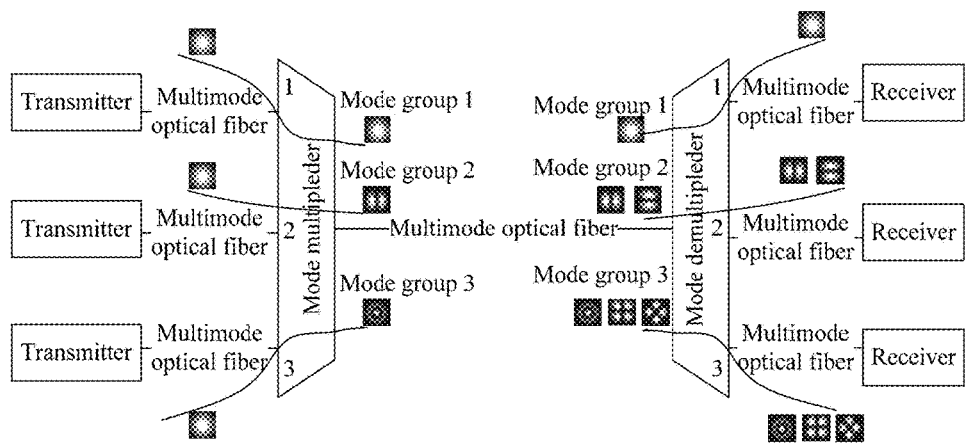
FIG. 5 is a schematic block diagram of a multimode optical fiber transmission method according to an embodiment of the present disclosure.

Specifically, in the following, with reference to FIG. 5, FIG. 5 is a schematic block diagram of a multimode optical fiber transmission method. As shown in FIG. 5, a transmitter transmits the optical signal to a mode multiplexer by using a multimode optical fiber.

Further, a system divides optical signals in different modes into multiple mode groups in advance. Each mode group as a whole carries an optical signal. Each mode group may include optical signals in one or more modes, where the one or more modes have a same propagation constant or approximate propagation constants. For example, an LP01-mode optical signal is classified as a mode group 1. That is, the mode group 1 includes an LP01-mode optical signal. An LP11a-mode optical signal and an LP11b-mode optical signal are classified as a mode group 2, optical signals in modes LP02, LP21a, and LP21b are classified as a mode group 3, and so on.

Further, the transmitter may use a vertical-cavity surface-emitting laser (VCSEL), may use a distributed feedback laser (DFB), or may use a Fabry-Perot (FP) laser.

Further, the transmitter may modulate, by using a data signal and by using an on-off keying (OOK) based modulation scheme, an optical signal for transmission. Alternatively, the transmitter may modulate, by using a data signal and by using a modulation scheme such as a phase shift keying (PSK) modulation scheme, a quadrature amplitude modulation (QAM) scheme, and a pulse amplitude modulation (PAM) scheme, an optical signal for transmission. A receiver may detect an optical signal in a direct detection manner, or may detect the optical signal in a coherent detection manner. Further, to eliminate crosstalk between optical signals in different modes in optical fiber transmission, pre-equalization may be performed on the transmitter side to eliminate interference from another channel, or filtering processing may be performed on the receiver side to eliminate interference from another channel, or pre-equalization may be performed on the transmitter side and filtering processing may be performed on the receiver side, to eliminate interference from another channel.

S402. A mode multiplexer receives the first optical signal from an input port.

Referring to FIG. 5, the mode multiplexer receives, from an input port 1, an optical signal transmitted by a first transmitter, receives, from an input port 2, an optical signal transmitted by a second transmitter, and so on.

Specifically, an optical fiber connected between the mode multiplexer and the transmitter is a multimode optical fiber, and an optical fiber between the mode multiplexer and the mode demultiplexer is also a multimode optical fiber.

S404. The mode multiplexer converts, according to a correspondence between an input port of an optical signal and a mode group, the received first optical signal into a second optical signal in one or more modes in a mode group corresponding to the input port.

There is a correspondence between the input port of the mode multiplexer and the mode group. For example, as shown in FIG. 5, the mode multiplexer receives, from the port 1, the optical signal transmitted by the first transmitter; and converts, according to the correspondence between an input port and a mode group, the optical signal that is transmitted by the first transmitter and that is received from the port 1 into the LP01-mode optical signal in the mode group 1. Herein, if the input optical signal is the LP01 optical signal, and a mode of the mode group 1 corresponding to the port 1 is also the LP01 optical signal, mode conversion is not performed, and the LP01 optical signal is still used. For another example, the mode multiplexer receives, from the input port 2, the optical signal transmitted by the second transmitter; converts, according to a correspondence between the port 2 and the mode group 2, the optical signal that is transmitted by the second transmitter and that is received from the port 2 into the LP11a-mode optical signal and/or the LP11b-mode optical signal in the mode group 2, and converts an optical signal that is transmitted by a third transmitter and that is received from a port 3 into the LP02-mode optical signal and/or the LP21a-mode optical signal and/or the LP21b-mode optical signal in the mode group 3; and multiplexes the optical signals obtained by means of conversion in the modes to the multimode optical fiber for output.

In addition, when signals are transmitted in an optical fiber, because the mode group includes optical signals in one or more modes, where the one or more modes have a same propagation constant or approximate propagation constants, crosstalk between mode groups is relatively small. Therefore, such division may reduce crosstalk between mode groups. For example, the LP01 optical signals in the mode group 1 are mainly still transmitted in the mode of the LP01 optical signals, and a very few of the optical signals are coupled to other mode groups because of crosstalk, to be transmitted. Both an LP11a-mode optical signal and an LP11b-mode optical signal belong to the mode group 2, and have basically the same propagation constants. Therefore, crosstalk and coupling occur in optical fiber transmission, and there will be both the LP11a-mode optical signal and the LP11b-mode optical signal that are transmitted to the mode demultiplexer. Likewise, crosstalk and coupling also occur between the LP02-mode optical signal and/or LP21a-mode optical signal or LP21b-mode optical signals in optical fiber transmission, and there will be the LP02 optical signal, the LP21a optical signal, and the LP21b optical signal that are transmitted to the mode demultiplexer.

S406. The mode demultiplexer receives a second optical signal, and determines a mode group to which the second optical signal belongs.

Specifically, the mode demultiplexer determines, according to optical signals in different modes included in different mode groups, the mode group to which the received second optical signal belongs.

S408. The mode demultiplexer outputs the received second optical signal from a corresponding output port according to a correspondence between an output port and a mode group.

Specifically, the optical signals from the different mode groups are transmitted in the multimode optical fiber and the optical signals from the different mode groups are forwarded to different output ports of the mode demultiplexer according to the correspondence between an output port and a mode group and according to a correspondence between an output port number and a mode group number.

As shown in FIG. 5, the mode demultiplexer receives the optical signals from the mode groups that are transmitted by using the multimode optical fiber. For example, the mode group 1 includes the LP01-mode optical signal; the mode group 2 includes the LP11a-mode optical signal, and the LP11b mode optical signal; and the mode group 3 includes the LP02-mode optical signal, the LP21a-mode optical signal, and the LP21b-mode optical signal. After receiving the optical signals from the different mode groups, the mode demultiplexer queries, according to mode group numbers of the optical signals, a correspondence between a mode group number and an output port number; obtains, by means of matching, output port numbers corresponding to the optical signals; and forwards the optical signals to output ports, corresponding to the port numbers, of the mode demultiplexer. For example, the mode demultiplexer receives the LP01 optical signal from the mode group 1; queries the correspondence between a mode group and a port; learns that the optical signal from the mode group 1 is forwarded from a port 1. Then, the mode demultiplexer forwards the LP01 optical signal from the mode group 1 by using the port 1, and after the LP01 optical signal is transmitted by using the multimode optical fiber, inputs the LP01 optical signal to a receiver for data restoration.

Optionally, the method further includes:

the mode demultiplexer is further configured to convert the second optical signal into a preset-mode optical signal for output.

Figure 6:
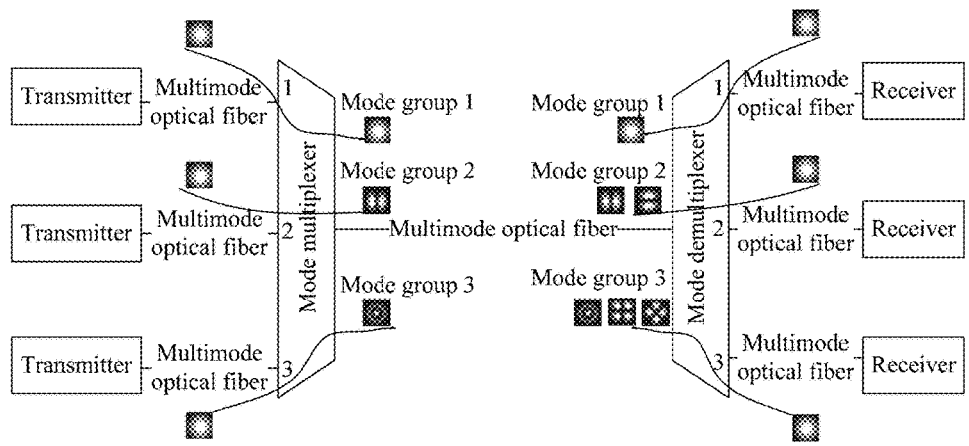
FIG. 6 is a schematic block diagram of another multimode optical fiber transmission method according to an embodiment of the present disclosure.

As shown in FIG. 6, FIG. 6 is a schematic block diagram of another data transmission method. In FIG. 6, a working process of the mode multiplexer is consistent with that in FIG. 5. A difference thereof lies in actions executed by the mode demultiplexer. For example, if the mode demultiplexer outputs an optical signal in a preset LP01 mode, the mode demultiplexer is further configured to: convert the received LP11a-mode optical signal and/or LP11b-mode optical signal from the mode group 2 into an optical signal in the preset LP01 mode, and output the optical signal obtained by means of conversion from a port 2. If the mode demultiplexer exactly receives the LP01-mode optical signal from the mode group 1, and also exactly presets that an LP01-mode optical signal is forwarded, conversion is not required. Likewise, the mode demultiplexer converts the received LP02-mode optical signal, LP21a-mode optical signal, and LP21b-mode optical signal that are included in the mode group 3 into the LP01-mode optical signals; outputs the LP01-mode optical signals to an output port 3; forwards the LP01-mode optical signals from the port 3; and after the LP01-mode optical signals are transmitted by using the multimode optical fiber, inputs the LP01-mode optical signals to receivers for data restoration.

Figure 7:
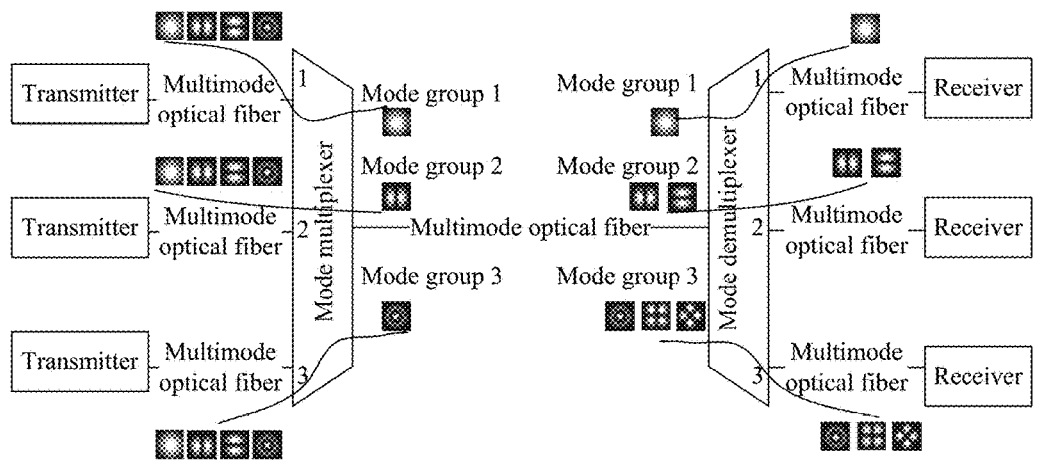
FIG. 7 is a schematic block diagram of still another multimode optical fiber transmission method according to an embodiment of the present disclosure.

Optionally, the method may further include:

As shown in FIG. 7, FIG. 7 is another data transmission method. Differences between FIG. 7 and FIG. 5 and between FIG. 7 and FIG. 6 lie in that a transmitter transmits optical signals in multiple modes, each port of the mode multiplexer may receive optical signals in different modes, and all other procedures are the same. That is, an input port of the mode multiplexer in FIG. 8 may input optical signals in different modes, but the mode multiplexer in FIG. 5 and FIG. 7 input optical signals in one mode. All other execution procedures executed by the mode demultiplexer and the like are the same, and reference may be made to FIG. 5 and FIG. 6.

Specifically, as shown in FIG. 5 and FIG. 6, the transmitter transmits a single-mode optical signal for transmission in a multimode optical fiber. The transmitter may use a single-transverse-mode laser to transmit a single-mode optical signal, or may use a mode selection laser transmission technology such as a mode filtering method, an eccentric injection method, or a spot-based mode shaping method, to ensure that only a single-mode optical signal is transmitted in the multimode optical fiber. To reduce mode crosstalk of optical signals in the optical fiber, the single-mode optical signal as shown may be an LP01-mode optical signal. As shown in FIG. 7, the transmitter may use an ordinary multi-mode transmitter. When the ordinary multi-mode transmitter couples with the multimode optical fiber, optical signals in multiple modes are excited, and then the optical signals in the multiple modes are transmitted in a multimode optical fiber. After receiving the signals by using the multimode optical fiber, the mode multiplexer converts, according to a correspondence between a mode group number and an input port number, the received optical signals in the multiple modes into optical signals in modes corresponding to port numbers (port numbers of receiving ports), and multiplexes the optical signals to the multimode optical fiber for transmission. For example, in FIG. 7, the transmitter uses an ordinary laser. When a transmitted optical signal passes through the multimode optical fiber, optical signals in modes such as the LP01 mode, the LP11a mode, the LP11b mode, and the LP02 mode are excited. After receiving the optical signals in the modes such as the LP01 mode, the LP11a mode, the LP11b mode, and the LP02 mode from an input port 1, the mode multiplexer converts, according to a correspondence between the input port 1 and the mode group 1, the received optical signals into optical signals in a mode included in the mode group 1. After receiving the optical signals in the modes such as the LP01 mode, the LP11a mode, the LP11b mode, and the LP02 mode from an input port 2, the mode multiplexer converts, according to a correspondence between the input port 2 and the mode group 2, the received optical signals into optical signals in the LP11a mode or/and LP11b mode in the mode group 2; and then multiplexes the optical signals to an optical fiber for transmission.

Functions of the mode demultiplexer are the same as those in FIG. 5 and FIG. 6, and only brief descriptions are provided herein. The mode demultiplexer receives the optical signals from the different mode group numbers by using the multimode optical fiber. For example, the mode demultiplexer receives an optical signal from the mode group 2. The mode group 2 includes the LP11a optical signal and the LP11b optical signal. After the mode demultiplexer finds a port 2 for these optical signals, the mode demultiplexer may directly forward these optical signals by using the port 2, as shown in FIG. 7 and FIG. 5. Alternatively, the mode demultiplexer converts the received optical signals in the different mode groups into optical signals in preset modes corresponding to mode group numbers, and outputs the optical signals by using the port 2, for example, as shown in FIG. 6.

Further, if a multimode optical fiber between the transmitter and a mode coupler is relatively long, after optical fiber transmission of the LP01-mode optical signals transmitted by the transmitter, some optical signals are coupled to another mode group because of crosstalk. The mode multiplexer may first filter a signal from a higher-order mode group, and then perform mode conversion.

S410. The receiver receives optical signals from different mode groups, and performs data restoration on the received optical signals.

Further, both the transmitter and the mode multiplexer may be integrated into an optical module, and the mode demultiplexer and the receiver are also integrated into an optical module. In this case, the transmitter and the mode multiplexer, and the receiver and the mode demultiplexer may perform direct spatial coupling, or perform coupling by using a waveguide, to omit a multimode optical fiber between the transmitter and the mode multiplexer and a multimode optical fiber between the receiver and the mode demultiplexer, as long as a mode of an input port of the mode multiplexer is controlled.

According to this embodiment of the present disclosure, a mode multiplexer receives a first optical signal from an input port; converts, according to a correspondence between an input port of an optical signal and a mode group, the received first optical signal into a second optical signal in one or more modes in a mode group corresponding to the input port; and multiplexes the second optical signal obtained by means of conversion to a multimode optical fiber for transmission. A mode demultiplexer receives the second optical signal; determines a mode group to which the second optical signal belongs; and outputs the received second optical signal from a corresponding output port according to a correspondence between an output port and a mode group without replacing an existing optical fiber of a data center. This implements big data transmission by increasing a transmission capacity of a single optical fiber, and implements fast expansion of the transmission capacity, thereby improving total bandwidth utilization of a system.

Figure 8:
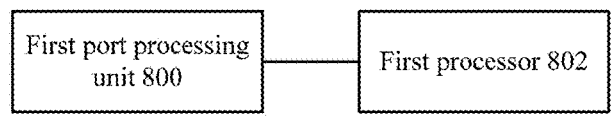
FIG. 8 is a schematic block diagram of a data communications apparatus according to an embodiment of the present disclosure.

FIG. 8 is a schematic structural block diagram of a mode multiplexer. As shown in FIG. 8, the mode multiplexer includes:

a first port processing unit 800, configured to receive a first optical signal from an input port; and multiplex, according to an instruction from a first processor, the second optical signal obtained by means of conversion to a multimode optical fiber for transmission; and the first processor 802, configured to: convert, according to a correspondence between an input port of an optical signal and a mode group, the received first optical signal into a second optical signal in one or more modes in a mode group corresponding to the input port; and instruct the first port processing unit to multiplex the second optical signal obtained by means of conversion to a multimode optical fiber for transmission.

Further, the first optical signal is an optical signal in one or more modes.

Further, the mode group includes optical signals in one or more modes, where the one or more modes have a same propagation constant or approximate propagation constants.

For specific functions of the mode multiplexer, refer to FIG. 1 to FIG. 7 and specific descriptions of the embodiments corresponding to FIG. 1 to FIG. 7. Details are not described herein again.

The present disclosure discloses a mode multiplexer. The mode multiplexer receives a first optical signal from an input port; converts, according to a correspondence between an input port of an optical signal and a mode group, the received first optical signal into a second optical signal in one or more modes in a mode group corresponding to the input port; and multiplexes the second optical signal obtained by means of conversion to a multimode optical fiber for transmission. This implements big data transmission by increasing a transmission capacity of a single optical fiber, and implements fast expansion of the transmission capacity, thereby improving total bandwidth utilization of a system.

Figure 9:
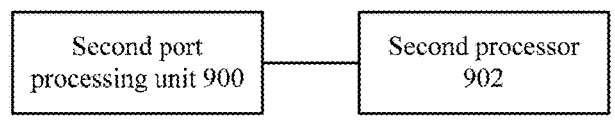
FIG. 9 is another schematic block diagram of a data communications apparatus according to an embodiment of the present disclosure.

FIG. 9 is a schematic structural block diagram of a mode demultiplexer. As shown in FIG. 9, the mode demultiplexer includes:

a second port processing unit 900, configured to receive a second optical signal; and output the received second optical signal from a corresponding output port according to an instruction from a second processor; and the second processor 902, configured to: determine a mode group to which the second optical signal belongs; obtain, according to a correspondence between an output port and a mode group, the output port corresponding to the received second optical signal; and instruct the second port processing unit to output the received second optical signal from the corresponding output port.

Further, the second processor 902 converts the second optical signal into a preset-mode optical signal for output.

Further, the second optical signal is an optical signal in one or more modes.

Further, the mode group includes optical signals in one or more modes, where the one or more modes have a same propagation constant or approximate propagation constants. For specific functions of the mode demultiplexer, refer to FIG. 1 to FIG. 7 and specific descriptions of the embodiments corresponding to FIG. 1 to FIG. 7. Details are not described herein again.

The present disclosure discloses a mode demultiplexer. The mode demultiplexer receives a second optical signal; determines a mode group to which the second optical signal belongs; and outputs the received second optical signal from a corresponding output port according to a correspondence between an output port and a mode group. This implements big data transmission by increasing a transmission capacity of a single optical fiber, and implements fast expansion of the transmission capacity, thereby improving total bandwidth utilization of a system.

As shown in FIG. 1A or FIG. 1B, the spatial division multiplexing system includes at least a mode multiplexer and a mode demultiplexer. The mode multiplexer may include the functions of the apparatus shown in FIG. 8, and the mode demultiplexer includes the functions shown in FIG. 9.

Specifically, the mode multiplexer is configured to: receive a first optical signal from an input port; convert, according to a correspondence between an input port of an optical signal and a mode group, the received first optical signal into a second optical signal in one or more modes in a mode group corresponding to the input port; and multiplex the second optical signal obtained by means of conversion to a multimode optical fiber for transmission.

The mode demultiplexer is configured to: receive a second optical signal; determine a mode group to which the second optical signal belongs; and output the received second optical signal from a corresponding output port according to a correspondence between an output port and a mode group.

Further, the mode group includes optical signals in one or more modes, where the one or more modes have a same propagation constant or approximate propagation constants.

Further, the first optical signal is an optical signal in one or more modes.

Further, the mode demultiplexer is further configured to convert the second optical signal into a preset-mode optical signal for output.

For details, refer to the descriptions of the apparatus embodiments corresponding to FIG. 8 and FIG. 9. Details are not described herein again.

According to this embodiment of the present disclosure, a mode multiplexer receives a first optical signal from an input port; converts, according to a correspondence between an input port of an optical signal and a mode group, the received first optical signal into a second optical signal in one or more modes in a mode group corresponding to the input port; and multiplexes the second optical signal obtained by means of conversion to a multimode optical fiber for transmission. A mode demultiplexer receives the second optical signal; determines a mode group to which the second optical signal belongs; and outputs the received second optical signal from a corresponding output port according to a correspondence between an output port and a mode group without replacing an existing optical fiber of a data center. This implements big data transmission by increasing a transmission capacity of a single optical fiber, and implements fast expansion of the transmission capacity, thereby improving total bandwidth utilization of a system.

Figure 10:
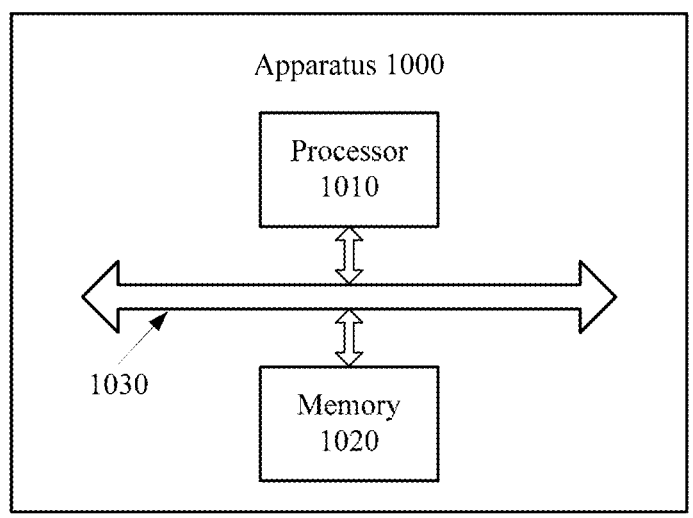
FIG. 10 is still another schematic block diagram of a data communications apparatus according to an embodiment of the present disclosure.

As shown in FIG. 10, an embodiment of the present disclosure further provides a data communications apparatus 1000. The apparatus 1000 includes a processor 1010, a memory 1020, and a bus system 1030. The processor 1010 and the memory 1020 are connected by using the bus system 1030. The memory 1020 is configured to store an instruction. The processor 1010 is configured to execute the instruction stored in the memory 1020.

The processor 1010 is configured to: receive a first optical signal from an input port; convert, according to a correspondence between an input port of an optical signal and a mode group, the received first optical signal into a second optical signal in one or more modes in a mode group corresponding to the input port; and multiplex the second optical signal obtained by means of conversion to a multimode optical fiber for transmission.

The processor 1010 is further configured to: receive a second optical signal; determine a mode group to which the second optical signal belongs; and output the received second optical signal from a corresponding output port according to a correspondence between an output port and a mode group.

Specifically, for a specific execution procedure of the processor 1010, reference may be made to descriptions corresponding to the flowcharts shown in FIG. 1 to FIG. 7. Details are not described herein again.

It should be understood that in this embodiment of the present disclosure, the processor 1010 may be a central processing unit (CPU), or the processor 1010 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

The memory 1020 may include a read-only memory and a random access memory, and provide an instruction and data to the processor 1010. A part of the memory 1020 may further include a non-volatile random access memory. For example, the memory 1020 may further store device type information.

In addition to a data bus, the bus system 1030 may further include a power bus, a control bus, a status signal bus, and the like. However, for clear description, various types of buses in the figure are marked as the bus system 1030.

In an implementation process, steps in the foregoing methods can be implemented by using a hardware integrated logic circuit in the processor 1010, or by using instructions in a form of software. The steps of the methods disclosed with reference to the embodiments of the present disclosure may be directly performed by using a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 1020, and the processor 1010 reads information from the memory 1020 and completes the steps in the foregoing methods in combination with the hardware of the processor. To avoid repetition, details are not described herein again.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be indirect couplings or communications connections between some interfaces, apparatuses, or units, or may be implemented in electronic, mechanical, or other forms.

The units described as separate parts may or may not be physically separate. Parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, comprising:
    receiving, by a processor, based on instructions stored in a memory, a first optical signal from an input port;
    converting, by the processor, based on instructions stored in the memory, according to a correspondence between an input port of an optical signal and a mode group, the received first optical signal into a second optical signal in one or more modes in a mode group corresponding to the input port; and
    multiplexing, by the processor, based on instructions stored in the memory, the second optical signal to a multimode optical fiber for transmission.

2. The data transmission method according to claim 1, wherein the first optical signal is an optical signal in one or more modes.

3. The data transmission method according to claim 1, wherein the mode group comprises optical signals in one or more modes having a same propagation constant or approximate propagation constants.

4. A data transmission method, comprising:
    receiving, by a processor, based on instructions stored in a memory, a second optical signal;
    determining, by the processor, based on instructions stored in the memory, a mode group to which the second optical signal belongs; and
    outputting, by the processor, based on instructions stored in the memory, according to a correspondence between an output port and a mode group, the received second optical signal from a corresponding output port.

5. The data transmission method according to claim 4, further comprising:
    converting, by the processor, based on instructions stored in the memory, the second optical signal into a preset-mode optical signal for output.

6. The data transmission method according to claim 4, wherein the second optical signal is an optical signal in one or more modes.

7. The data transmission method according to claim 4, wherein the mode group comprises optical signals in one or more modes having a same propagation constant or approximate propagation constants.

8. A mode multiplexer, comprising:
    a first port processing unit, configured to:
        receive a first optical signal from an input port;
    a first processor, configured to:
        convert, according to a correspondence between an input port of an optical signal and a mode group, the received first optical signal into a second optical signal in one or more modes in a mode group corresponding to the input port, and
        instruct the first port processing unit to multiplex the second optical signal to a multimode optical fiber for transmission; and
    wherein the first port processing unit is further configured to:
        multiplex, according to an instruction from the first processor, the second optical signal to a multimode optical fiber for transmission.

9. The mode multiplexer according to claim 8, wherein the first optical signal is an optical signal in one or more modes.

10. The mode multiplexer according to claim 8, wherein the mode group comprises optical signals in one or more modes having a same propagation constant or approximate propagation constants.

11. A mode demultiplexer, comprising:
    a second port processing unit, configured to:
        receive a second optical signal;
    a second processor, configured to:
        determine a mode group to which the received second optical signal belongs,
        obtain, according to a correspondence between an output port and a mode group, the output port corresponding to the received second optical signal, and
        instruct the second port processing unit to output the received second optical signal from the corresponding output port; and
    wherein the second port processing unit is further configured to:
        output, according to an instruction from the second processor, the received second optical signal from a corresponding output port.

12. The mode demultiplexer according to claim 11, wherein:
    the second processor is further configured to:
        convert the second optical signal into a preset-mode optical signal, and
        instruct the second port processing unit to output the signal obtained by means of conversion from a corresponding output port; and
    the second port processing unit is further configured to:
        output the optical signal obtained by means of conversion from the corresponding port according to an instruction from the second processor.

13. The mode demultiplexer according to claim 11, wherein the second optical signal is an optical signal in one or more modes.

14. The mode demultiplexer according to claim 11, wherein the mode group comprises optical signals in one or more modes having a same propagation constant or approximate propagation constants.

15. A data communications apparatus, comprising
    a processor; and
    a memory, coupled to the processor via a bus system, configured to store instructions which, when executed by the processor, cause the processor to:
        receive a first optical signal from an input port,
        convert, according to a correspondence between an input port of an optical signal and a mode group, the received first optical signal into a second optical signal in one or more modes in a mode group corresponding to the input port, and
        multiplex the second optical signal to a multimode optical fiber for transmission.

16. A data communications apparatus, comprising:
    a processor; and
    a memory, coupled to the processor via a bus system, configured to store instructions which, when executed by the processor, cause the processor to:
        receive a second optical signal,
        determine a mode group to which the second optical signal belongs, and
        output the received second optical signal from a corresponding output port according to a correspondence between an output port and a mode group.

* * * * *